United States Patent
Miyazaki

(10) Patent No.: US 10,562,179 B2
(45) Date of Patent: Feb. 18, 2020

(54) ARTICULATED SHAFT STRUCTURE OF ROBOT AND ROBOT

(71) Applicant: Fanuc Corporation, Yamanashi (JP)

(72) Inventor: Genki Miyazaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/263,620

(22) Filed: Jan. 31, 2019

(65) Prior Publication Data
US 2019/0275668 A1    Sep. 12, 2019

(30) Foreign Application Priority Data
Mar. 6, 2018    (JP) .................. 2018-039607

(51) Int. Cl.
| B25J 17/00 | (2006.01) |
| B25J 17/02 | (2006.01) |
| B25J 18/00 | (2006.01) |
| B25J 9/10  | (2006.01) |
| F16H 1/14  | (2006.01) |

(52) U.S. Cl.
CPC ............ *B25J 9/102* (2013.01); *B25J 17/0258* (2013.01); *F16H 1/145* (2013.01)

(58) Field of Classification Search
CPC ........ B25J 9/102; B25J 17/0258; F16H 1/145
See application file for complete search history.

(56) References Cited

U.S. PATENT DOCUMENTS

| 5,782,133 A * | 7/1998 | Kullborg .................. B25J 9/102 |
| | | 74/417 |
| 2015/0013491 A1 | 1/2015 | Mori |
| 2017/0274524 A1* | 9/2017 | Inoue ...................... B25J 9/102 |
| 2017/0282358 A1 | 10/2017 | Inoue et al. |

FOREIGN PATENT DOCUMENTS

| JP | 2007-151361 A | 6/2007 |
| JP | 2015-016523 A | 1/2015 |
| JP | 2017-185574 A | 10/2017 |

* cited by examiner

*Primary Examiner* — Jake Cook
(74) *Attorney, Agent, or Firm* — Winstead PC

(57) ABSTRACT

The articulated shaft structure includes: a first joint member; a second joint member supported rotatable about a first axis; a ring-like output hypoid gear fixed to the second joint member coaxially with the first axis; a gear assembly attached to the first joint member; and a motor, wherein the gear assembly includes a housing member, an input hypoid gear, and gears, the housing member including a second joining surface fixed to a first joining surface, the input hypoid gear being supported by the housing member rotatable about a second axis, the gears decelerating rotation of the motor and transmitting the rotation to the input hypoid gear, the first joining surface is parallel to the first axis, the second joining surface is perpendicular to the second axis, and the bolt is fastened radially outside of the gears of all kinds assumed to be used, the kinds being defined by reduction ratios.

3 Claims, 5 Drawing Sheets

ARTICULATED SHAFT STRUCTURE OF ROBOT AND ROBOT

CROSS-REFERENCE TO RELATED APPLICATIONS

This application claims the benefit of Japanese Patent Application No. 2018-039607, the content of which is incorporated herein by reference.

TECHNICAL FIELD

The present invention relates to an articulated shaft structure of a robot and the robot.

BACKGROUND ART

An articulated shaft structure has been known that allows a wrist unit at a distal end of a forearm of a robot to rotate about a longitudinal axis of the forearm (e.g., see Patent Literature 1).

In this articulated shaft structure, a ring-like output hypoid gear coupled with the wrist unit is supported by a proximal end of the forearm through bearings so as to be rotatable coaxially with the longitudinal axis of the forearm. Further, a unit including a housing member that rotatably supports the input hypoid gear and also supports a motor and gears for decelerating and transmitting rotation of the motor to the input hypoid gear is mounted on a proximal side surface of a part of the forearm. This causes the input hypoid gear to engage with the output hypoid gear.

CITATION LIST

Patent Literature

{PTL 1}
Japanese Unexamined Patent Application, Publication No. 2017-185574

SUMMARY OF INVENTION

According to an aspect of the present invention, there is provided an articulated shaft structure of a robot, the structure including: a first joint member; a second joint member supported by the first joint member so as to be rotatable about a first axis; a ring-like output hypoid gear fixed to the second joint member coaxially with the first axis; a gear assembly attached to the first joint member; and a motor attached to the gear assembly, wherein the gear assembly includes a housing member, an input hypoid gear, and gears, the housing member including a second joining surface tightly fixed to a first joining surface of the first joint member with a bolt, the input hypoid gear being supported by the housing member so as to be rotatable about a second axis, the gears decelerating rotation of the motor and transmitting the rotation to the input hypoid gear, the first joining surface is parallel to the first axis, the second joining surface is perpendicular to the second axis, with the housing member being fixed to the first joint member, the input hypoid gear is situated at a position where the input hypoid gear engages with the output hypoid gear, and the bolt is fastened radially outside of the gears of all kinds that are assumed to be used, the kinds being defined by reduction ratios.

DESCRIPTION OF EMBODIMENTS

An articulated shaft structure 10 of a robot 1 and the robot 1 according to an embodiment of the present invention will be described below with reference to the drawings.

Figure 1:
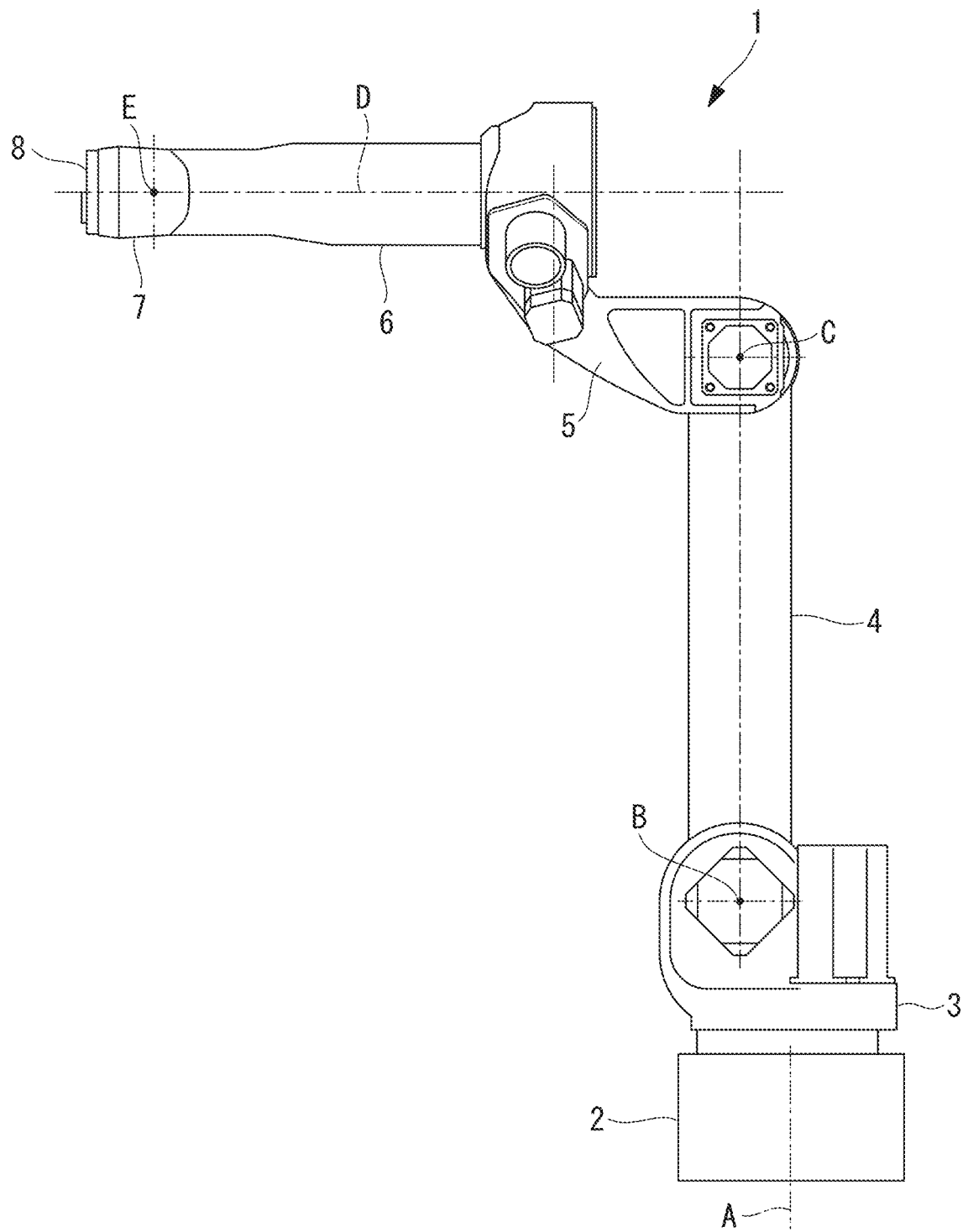
FIG. 1 is a side view illustrating an exemplary robot according to an embodiment of the present invention.

As shown in FIG. 1, the robot 1 according to the present embodiment is an upright articulated type robot. The robot 1 includes: a base 2 installed on an installation surface such as a floor; a rotary body 3 capable of rotating about a vertical number-one axis A and relative to the base 2; a first arm 4 capable of swinging about a horizontal number-two axis B and relative to the rotary body 3; a forearm (the first joint member) 5 provided at a distal end of the first arm 4 and capable of swinging about a horizontal number-three axis C and relative to the first arm 4; a cylindrical second arm (the second joint member) 6 provided at a distal end of the forearm 5 and capable of rotating about a number-four axis (the first axis) D that extends along a plane perpendicular to the number-three axis C; a second wrist element 7 provided at a distal end of the second arm 6 and capable of swinging about a number-five axis E perpendicular to the number-four axis D; and a third wrist element 8 capable of rotating about a number-six axis perpendicular to the number-five axis E.

Figure 2:
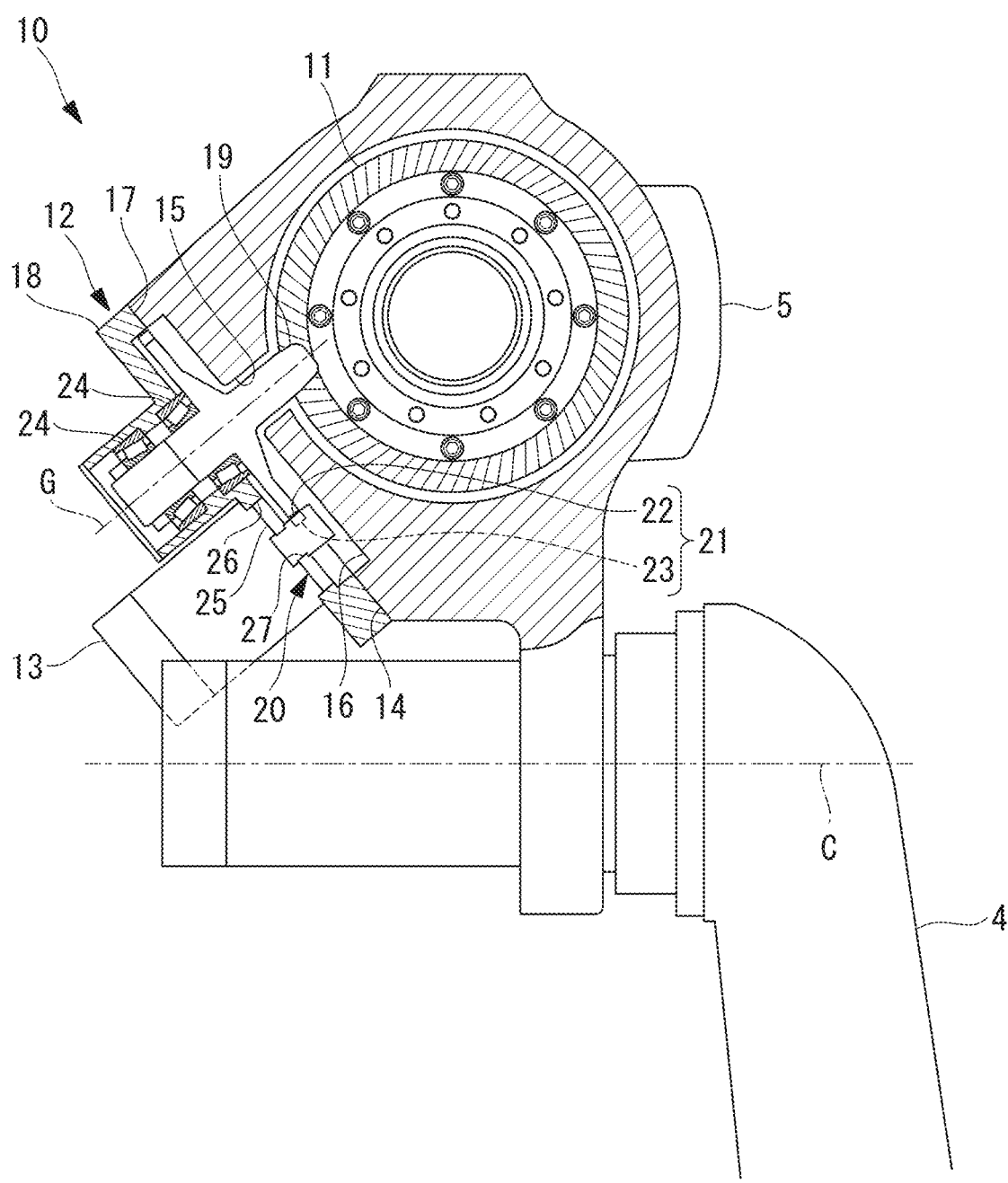
FIG. 2 is a partial vertical cross-sectional view illustrating an exemplary articulated shaft structure provided to the robot of FIG. 1 according to the embodiment of the present invention.
Figure 3:
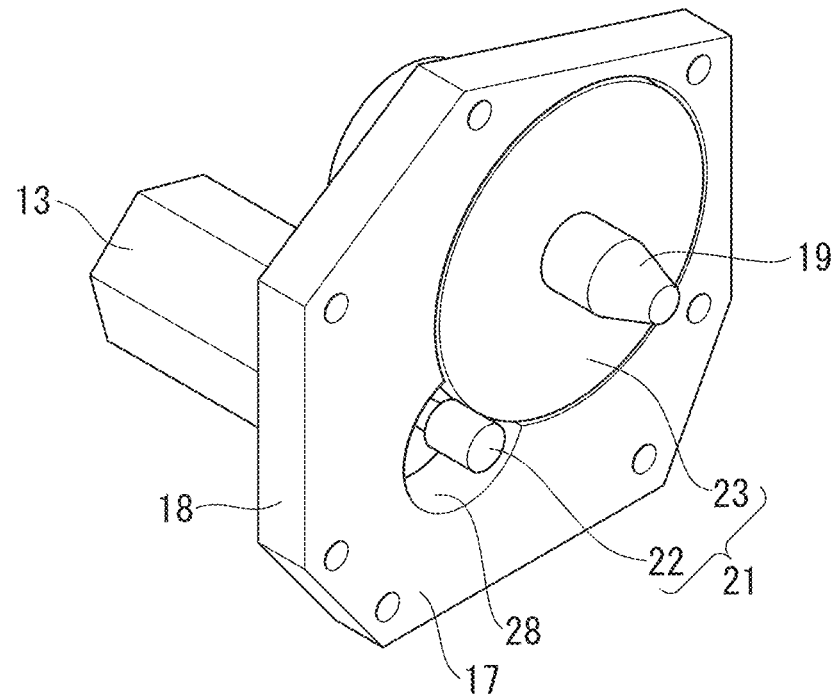
FIG. 3 is a perspective view of a gear assembly provided to the articulated shaft structure of FIG. 2, as viewed from a second joining surface side.

The articulated shaft structure 10 according to the present embodiment has a structure that, for example, drives the second arm 6 to rotate relative to the forearm 5. More specifically, as shown in FIGS. 2 and 3, the articulated shaft structure 10 according to the present embodiment includes the forearm 5, the second arm 6, a ring-like output hypoid gear 11 fixed to a proximal end of the second arm 6 coaxially with the number-four axis D, a gear assembly 12 attached to the forearm 5, and a motor 13 attached to the gear assembly 12.

The forearm 5 includes a first joining surface 14 on its side surface. The first joining surface 14 lies in parallel with the number-four axis D and is mounted with the gear assembly 12. The first joining surface 14 is provided with a through hole 15 that allows for insertion of an input hypoid gear 19 (described later), and a recess (the first recess, the second recess) 16 capable of accommodating a gear group 21 (described later).

The gear assembly 12 includes: a housing member 18 including a second joining surface 17 tightly mounted on the first joining surface 14 of the forearm 5; the input hypoid gear 19 supported so as to be rotatable about an axis (the second axis) G perpendicular to the second joining surface 17 of the housing member 18; a motor mounting part 20 mounted with the motor 13; and the gear group (the gears) 21 decelerating rotation of the motor 13 and transmitting the rotation to the input hypoid gear 19.

In the case of a standard weight capacity, the gear group 21 consists of, for example, a small gear (the gears) 22 that is a spur gear attached to a shaft of the motor 13 and a large gear (the gears) 23 that is a spur gear coaxially fixed to the input hypoid gear 19. The input hypoid gear 19 is supported by the housing member 18 through bearings 24 so as to be rotatable about the axis G.

The motor mounting part 20 includes a mounting surface 25 parallel to the second joining surface 17. The mounting surface 25 is provided with screw holes (not shown in the figure) to which respective bolts (not shown in the figure) for fixing the motor 13 are fastened. The motor mounting part 20 is further provided with a fitting hole 26 into which a mating part of the motor 13 is fitted, and a through hole 27 that allows for insertion of the shaft and the small gear 22. The shaft and the small gear 22 are inserted through the through hole 27, the mating part of the motor 13 is fitted into the fitting hole 26, and a flange of the motor 13 is brought into tight contact with the mounting surface 25. This causes the small gear 22 to engage with the large gear 23. In this state, the bolts are fastened to the respective screw holes, whereby the motor 13 may be fixed to the housing member 18.

As shown in FIG. 3, the second joining surface 17 of the housing member 18 is provided with an opening 28 that exposes the small gear 22 and the large gear 23 engaging with each other. The opening 28 has a shape that surrounds the small gear 22 and the large gear 23 with a certain gap formed in an outward radial direction.

With the input hypoid gear 19 having the large gear 23 and the motor 13 having the small gear 22 being attached to the housing member 18, at least a part of the input hypoid gear 19, the large gear 23 and the small gear 22 protrudes in a direction perpendicular to the second joining surface 17.

By the way, in order to adapt the robot 1 and the articulated shaft structure 10 of the robot 1 according to the present embodiment to an application that requires an increased weight capacity (heavy weight capacity) without changing the motor 13, a reduction ratio of the gear group 21 needs to be changed. Thus, for example, a two-stage gear 29 is disposed between the small gear 22 attached to the motor 13 and the large gear 23 attached to the input hypoid gear 19, as shown in FIG. 4.

In this case, the two-stage gear 29 integrally includes a number-two large gear 30 engaging with the small gear 22 and a number-two small gear 31 engaging with the large gear 23. The two-stage gear 29 is supported by a housing member 33, which is shaped differently from the housing member 18, through bearings (not shown in the figure) so as to be rotatable about an axis parallel to the axis G of the input hypoid gear 19.

Figure 4:
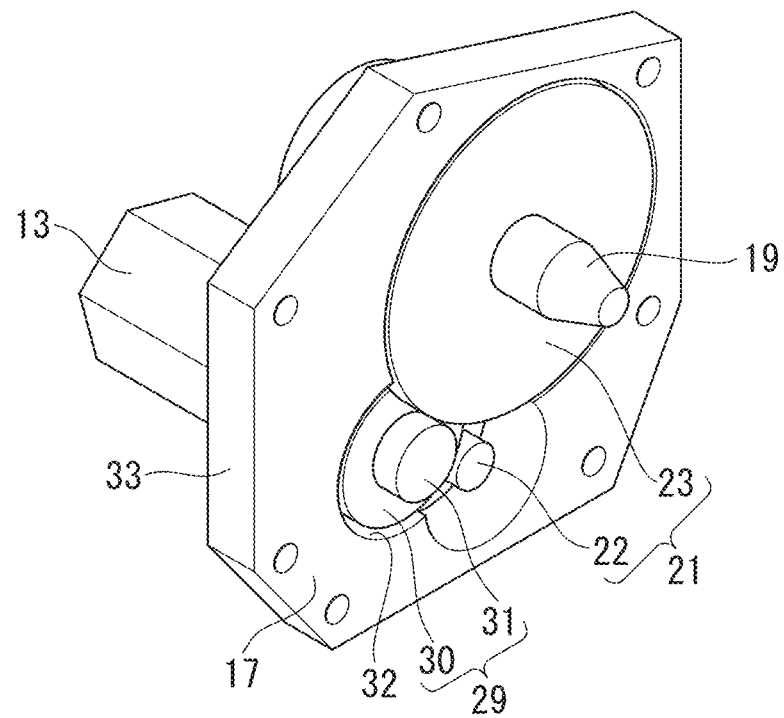
FIG. 4 is a perspective view of a gear assembly having a heavy weight capacity used for the articulated shaft structure of FIG. 2, as viewed from the second joining surface side.

Further, in this case, the second joining surface 17 of the housing member 33 is provided with an opening 32 that exposes the small gear 22, the large gear 23 and the two-stage gear 29, as shown in FIG. 4.

The recess 16 of the first joining surface 14 on the side surface of the forearm 5 lies in the area that covers both of the opening 28 of the second joining surface 17 in the case of the standard weight capacity shown in FIG. 3 and the opening 32 of the second joining surface 17 in the case of the heavy weight capacity shown in FIG. 4. Also, the depth of the recess 16 of the first joining surface 14 from the top of the first joining surface 14 is set greater than the protruding amount of the gear group 21 protruding from the second joining surface 17 of the housing member 33.

Further, with the first joining surface 14 and the second joining surface 17 tightly contacting each other, the bolts for fixing the gear assembly 12 to the forearm 5 are fastened into the respective screw holes located outside of the recess 16 of the first joining surface 14. The screw holes are outwardly spaced from the recess 16, and a seal member (not shown in the figure) is inserted into the space. This liquid-tightly seals the first joining surface 14 and the second joining surface 17.

An operation of the robot 1 and the articulated shaft structure 10 of the robot 1 according to the present embodiment configured as above will be explained below.

In the robot 1 according to the present embodiment, the motor 13 is actuated to rotate the second arm 6 about the number-four axis D and relative to the forearm 5.

The rotation of the motor 13 is decelerated at the reduction ratio equal to the gear ratio of the small gear 22 to the large gear 23 when being transmitted to the large gear 23 through the small gear 22 fixed to the shaft of the motor 13. This causes the input hypoid gear 19 fixed to the large gear 23 to rotate, which in turn causes the output hypoid gear 11 engaging with the input hypoid gear 19 to rotate about the number-four axis D. This makes it possible to rotate the second arm 6, to which the output hypoid gear 11 is fixed, about the number-four axis D and relative to the forearm 5.

In this case, when the need arises to increase the torque of the second arm 6 in order to adapt the robot 1 and the articulated shaft structure 10 of the robot 1 according to the present embodiment to an application that requires a heavier weight capacity, the gear assembly 12 is replaced.

In replacing the gear assembly 12, the second arm 6 is rotated to the angle at which the torque of the second arm 6 is minimized. In this state, the motor 13 is removed from the housing member 18, and the bolts fixing the housing member 18 to the forearm 5 are removed. The gear assembly 12 is thus removed from the forearm 5.

Then, another gear assembly 12 that includes a gear group 21 having a different reduction ratio is attached to the forearm 5. Although at least a part of the input hypoid gear 19 and the gear group 21 protrudes from the second joining surface 17 of the housing member 18 of the gear assembly 12, the first joining surface 14 of the forearm 5 is provided with the recess 16 that is dimensioned to be capable of even accommodating the new gear group 21. Thus, aligning the input hypoid gear 19 with the through hole 15 of the forearm 5 and moving the second joining surface 17 close to the first joining surface 14 results in the gear group 21 being accommodated in the recess 16 of the first joining surface 14. With the first joining surface 14 and the second joining surface 17 being positioned in tight contact with each other, the input hypoid gear 19 engages with the output hypoid gear 11. Then, fastening of the bolts makes it possible to fix the gear assembly 12 to the forearm 5.

Then, the motor 13, which has been removed, is fixed to the mounting surface 25 of the motor mounting part 20. This allows the small gear 22 fixed to the shaft of the motor 13 to engage with the number-two large gear 30 attached to the housing member 33. As a result, the rotation of the motor 13 is more greatly decelerated before being transmitted to the input hypoid gear 19, so that the robot 1 and the articulated shaft structure 10 of the robot 1 may be adapted to an application that requires a heavier weight capacity.

That is, just by replacing the gear assembly 12, the robot 1 and the articulated shaft structure 10 of the robot 1 according to the present embodiment may be adapted to applications each requiring a different weight capacity. In this case, the input hypoid gear 19 engaging with the output hypoid gear 11 can be shared by two gear assemblies 12, and the large gear 23 fixed to the input hypoid gear 19 and other parts including bearings rotatably fixing these gears 19, 23 to the housing member 18 or 33 can also be shared.

Figure 5:
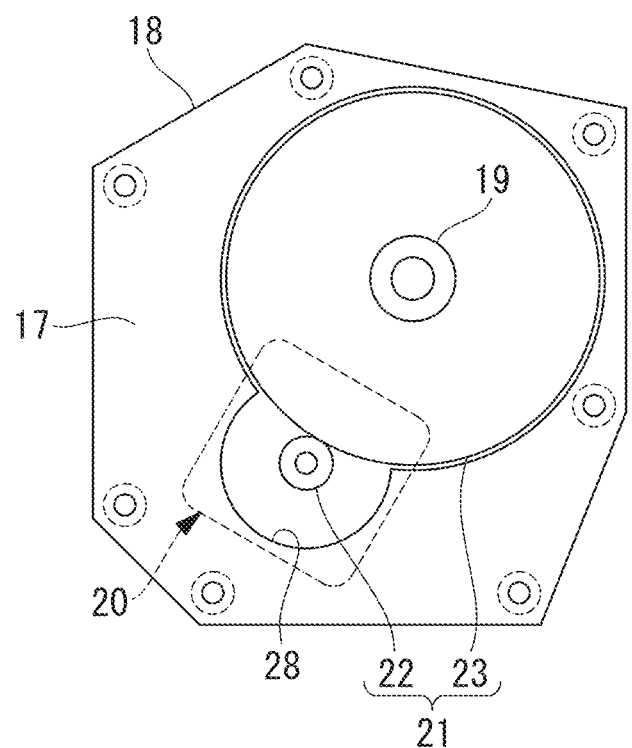
FIG. 5 is a front view of the second joining surface of the gear assembly of FIG. 3, as viewed from a direction along an axis of the input hypoid gear.
Figure 6:
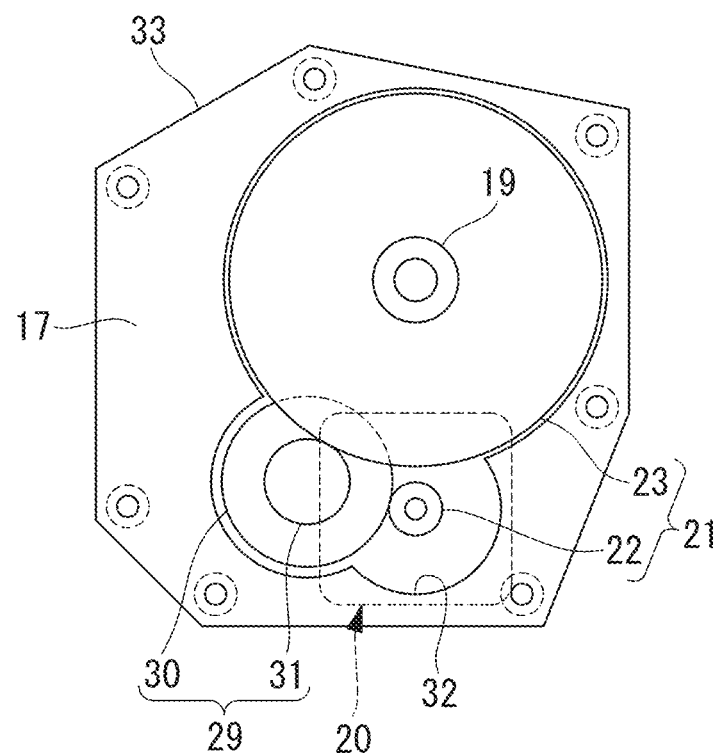
FIG. 6 is a front view of the second joining surface of the gear assembly of FIG. 4, as viewed from the direction along the axis of the input hypoid gear.

Further, as shown in FIGS. 5 and 6, positions and sizes of the gears 22, 23, 30 and 31 protruding from the second joining surface 17 are different between the two gear assemblies 12, depending on the presence of the two-stage gear 29 for changing the reduction ratio. Accordingly, the recess 16 of the first joining surface 14 is sized to be capable of even accommodating any of the gears 22, 23, 30 and 31. Further, the bolts for fixing the gear assembly 12 to the forearm 5 are located and fastened outside of the opening 28 or 32 accommodating the gears 22, 23, 30, 31. This makes it possible to tightly contact the first joining surface 14 and the second joining surface 17 and bring them into a sealed state, regardless of which of the two gear assemblies 12 are used.

As a result, the robot 1 and the articulated shaft structure 10 of the robot 1 according to the present embodiment give an advantage in that they can be adapted to various applications requiring different weight capacities just by replacing the gear assembly 12 on the spot where the robot 1 is installed. That is, two kinds of robots 1 having different weight capacities can share the same parts of the forearm 5. The same motor 13 can also be shared, giving an advantage in that a great change in an outer shape can be avoided.

Further, in the present embodiment, at least a part of the gears 22, 23 protrudes from the second joining surface 17, and the recess 16 for accommodating this protruding part of the gears 22, 23 is provided on the first joining surface 14. This eliminates the need for accommodating the gears 22, 23 entirely in the housing member 18 and thus allows the housing member 18, which is subject to replacement, to be thinner. This gives an advantage in that the gear assembly 12 can be lighter for easier replacement.

The present embodiment has exemplarily described the case of replacing two gear assemblies 12 that are respectively composed of gear groups 21 having mutually different reduction ratios. Instead of this, the present invention may be applied to the case of replacing three or more gear assemblies 12. In that case too, the recess 16 capable of accommodating the gears 22, 23 of each gear assembly 12 may be provided on the first joining surface 14 of the forearm 5, and the bolts may be fastened outside of the opening 28 that is provided on the second joining surface 17 of each gear assembly 12 to accommodate the gears 22, 23.

Figure 7:
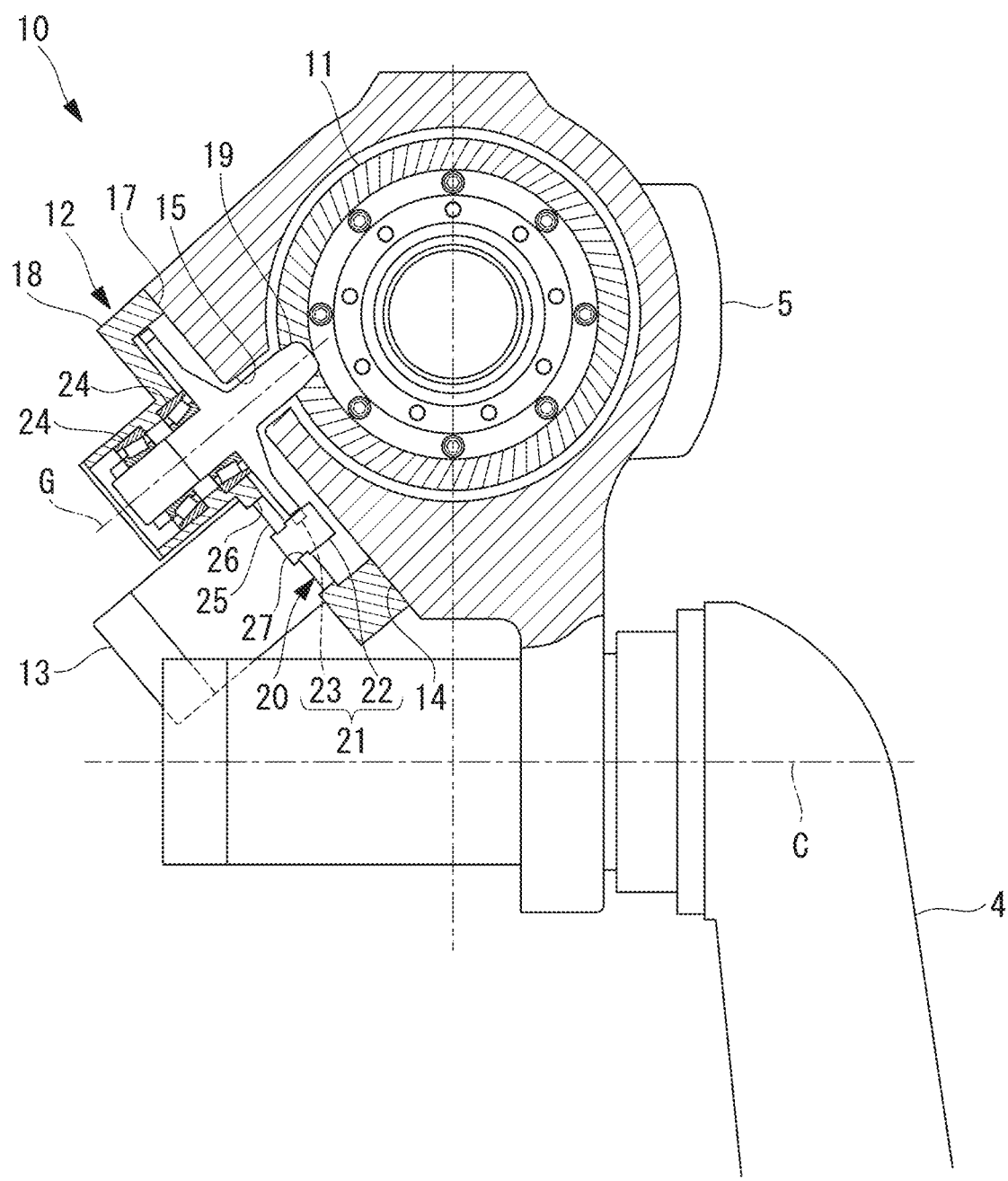
FIG. 7 is a partial vertical cross-sectional view illustrating a modified example of the articulated shaft structure of FIG. 2.

Also, instead of protruding at least a part of the gears 22, 23 from the second joining surface 17 as described above, only the input hypoid gear 19 may be protruded from the second joining surface 17 and other gears 22, 23 may be accommodated in the opening 28 so as not to protrude from the second joining surface 17, as shown in FIG. 7. This eliminates the need for providing the recess 16 on the first joining surface 14 to accommodate the gears 22, 23, simplifying the configuration of the forearm 5.

In the present embodiment, the first joining surface 14 of the forearm 5 is provided with the recess 16 shaped to be capable of accommodating the gear group 21 of each of multiple gear assemblies 12 that are assumed to be used. Instead of this, the first joining surface 14 may be provided with a recess (the second recess) 16 shaped to be capable of accommodating the gear group 21 of any one gear assembly 12, and the forearm 5 may have a shape that allows for formation of another recess (the first recess) 16 capable of accommodating the gear group 21 of each of other gear assemblies 12 that are assumed to be used. That is, this configuration at least allows materials of the forearm 5 to be shared by robots 1 having different weight capacities, which in turn allows for an easy parts management.

In this case, it is difficult to adapt the robot 1 having a different weight capacity on the spot. However, the robot 1 can be adapted for a different weight capacity just by adding the recess 16 to the first joining surface 14 of the forearm 5 and changing the gear assembly 12.

Although the spur gears have been given as an example of the gears 22, 23 constituting the gear group 21, any other gear may be used.

From the above-described embodiment, the following invention is derived.

According to an aspect of the present invention, there is provided an articulated shaft structure of a robot, the structure including: a first joint member; a second joint member supported by the first joint member so as to be rotatable about a first axis; a ring-like output hypoid gear fixed to the second joint member coaxially with the first axis; a gear assembly attached to the first joint member; and a motor attached to the gear assembly, wherein the gear assembly includes a housing member, an input hypoid gear, and gears, the housing member including a second joining surface tightly fixed to a first joining surface of the first joint member with a bolt, the input hypoid gear being supported by the housing member so as to be rotatable about a second axis, the gears decelerating rotation of the motor and transmitting the rotation to the input hypoid gear, the first joining surface is parallel to the first axis, the second joining surface is perpendicular to the second axis, with the housing member being fixed to the first joint member, the input hypoid gear is situated at a position where the input hypoid gear engages with the output hypoid gear, and the bolt is fastened radially outside of the gears of all kinds that are assumed to be used, the kinds being defined by reduction ratios.

According to the above aspect, when the second joining surface of the housing member constituting the gear assembly tightly contacts the first joining surface of the first joint member, the input hypoid gear rotatably supported by the housing member engages with the output hypoid gear fixed to the second joint member rotatably supported by the first joint member. In this state, the bolt is fastened to fix the gear assembly to the first joint member and also the motor is fixed to the housing member. This constitutes the articulated shaft structure.

The rotation of the motor is decelerated by the gears before being transmitted to the input hypoid gear. The rotation of the input hypoid gear is decelerated depending on a gear ratio of the input hypoid gear to the output hypoid gear before being transmitted to the output hypoid gear, which causes the second joint member to rotate about the first axis and relative to the first joint member.

In this case, when the sizes and numbers of the gears are changed to adapt to an application requiring a heavier weight capacity without changing the size of the motor, the opening provided in the second joining surface of the housing member has its shape changed. According to the above aspect, whichever of gear assemblies each having a differently shaped opening is attached to the first joint member, the bolt can be fastened outside of the opening. This makes it possible to seal the opening.

In the above aspect, at least a part of the gears may protrude from the second joining surface, the first joint member may have a shape that allows for formation of a first recess to accommodate the gears of the kinds each having a different reduction ratio, and the first joining surface may include a second recess capable of accommodating the gears of at least one of the kinds.

With this configuration, when a gear assembly of gears having a reduction ratio is attached to the first joint member, a part of the gears protruding from the second joining surface is accommodated in the second recess provided on the first joining surface, whereby the first joining surface and the second joining surface may tightly contact with each other. This helps avoid increase in the thickness of the housing member in the direction of the second axis.

In the case where the first joining surface includes the second recess capable of accommodating the gears of all kinds that are assumed to be used, one gear assembly may be removed and another gear assembly may be attached to the first joint member. This makes it possible to easily adapt to an application requiring a heavier weight capacity.

On the other hand, in the case where the first joining surface includes the second recess only capable of accommodating the gears of one kind, the recess may be processed to be capable of even accommodating gears of other reduction ratios, and thereby a gear assembly of gears of a different reduction ratio may be attached to the first joint member. In other words, use of the first joint member having a shape that allows for formation of the first recess to accommodate gears of multiple kinds each having a different reduction ratio at least allows materials to be shared by first joint members before being processed.

In the above aspect, the second recess may have a size equal to that of the first recess.

This configuration allows one gear assembly to be removed and another gear assembly to be attached to the first joint member. This makes it possible to easily adapt the robot to an application requiring a heavier weight capacity. In adapting the robot, additional processing on the first joint member is unnecessary; the gear assembly may be replaced on the spot to easily increase the weight capacity According to another aspect of the present invention, there is provided a robot including at least one joint having an articulated shaft structure of any one of the above aspects.

REFERENCE SIGNS LIST

1 Robot
5 Forearm (first joint member)
6 Second arm (second joint member)
10 Articulated shaft structure
11 Output hypoid gear
12 Gear assembly
13 Motor
14 First joining surface
16 Recess (first recess, second recess)
17 Second joining surface
18, 33 Housing member
19 Input hypoid gear
21 Gear group (gears)
22 Small gear (gears)
23 Large gear (gears)
D number-four axis (first axis)
G Axis (second axis)

The invention claimed is:

1. An articulated shaft structure comprising:
a first joint member;
a second joint member supported by the first joint member so as to be rotatable about a first axis;
an output hypoid gear fixed to the second joint member coaxially with the first axis;
a gear assembly attached to the first joint member;
a motor attached to the gear assembly;
wherein the gear assembly includes a housing member, an input hypoid gear, and a gear group including gears, the housing member including a second joining surface tightly fixed to a first joining surface of the first joint member with a bolt, the input hypoid gear being supported by the housing member so as to be rotatable about a second axis, the gears decelerating rotation of the motor and transmitting the rotation to the input hypoid gear,
wherein the first joining surface is parallel to the first axis;
wherein the second joining surface is perpendicular to the second axis;
wherein, with the housing member being fixed to the first joint member, the input hypoid gear is situated at a position where the input hypoid gear engages with the output hypoid gear;
wherein the bolt is fastened radially outside of all the gears included in the gear group;
wherein at least a part of the gear group protrudes from the second joining surface;
wherein the first joining surface includes a second recess capable of accommodating the protruded part of the gear group; and
wherein the first joint member has a shape that allows for formation of a first recess to accommodate another gear group having different reduction ratio from the gear group in which the part thereof is protruded from the second joining surface.

2. The articulated shaft structure according to claim 1, wherein the second recess has a size equal to that of the first recess.

3. A robot comprising at least one joint having an articulated shaft structure according to claim 1.

* * * * *